(12) United States Patent
Gomita (10) Patent No.: US 11,386,574 B2
(45) Date of Patent: Jul. 12, 2022

(54) SELF-POSITION ESTIMATION DEVICE, SELF-POSITION ESTIMATION METHOD, AND PROGRAM THEREOF

(71) Applicant: SONY CORPORATION, Tokyo (JP)

(72) Inventor: Jun Gomita, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/045,880

(22) PCT Filed: Apr. 11, 2019

(86) PCT No.: PCT/JP2019/015755
§ 371 (c)(1),
(2) Date: Oct. 7, 2020

(87) PCT Pub. No.: WO2019/208234
PCT Pub. Date: Oct. 31, 2019

(65) Prior Publication Data
US 2021/0142510 A1  May 13, 2021

(30) Foreign Application Priority Data

Apr. 26, 2018 (JP) .............................. JP2018-085420

(51) Int. Cl.
| | | |
|---|---|---|
| G06T 7/593 | (2017.01) | |
| H04N 13/296 | (2018.01) | |
| H04N 13/239 | (2018.01) | |
| G06T 7/73 | (2017.01) | |

(52) U.S. Cl.
CPC ............... *G06T 7/73* (2017.01); *G06T 7/593* (2017.01); *H04N 13/239* (2018.05); *H04N 13/296* (2018.05); *G06T 2207/10021* (2013.01)

(58) Field of Classification Search
CPC ............ G06T 7/70; G06T 2207/10021; H04N 13/296; H04N 13/239
See application file for complete search history.

(56) References Cited

U.S. PATENT DOCUMENTS

| | | | | |
|---|---|---|---|---|
| 10,295,365 B2* | 5/2019 | Scherer | ................... | G06T 7/285 |
| 2014/0139639 A1* | 5/2014 | Wagner | ................... | G06T 17/00 348/46 |

(Continued)

FOREIGN PATENT DOCUMENTS

JP     2016-045874 A     4/2016

OTHER PUBLICATIONS

English Translation of the Written Opinion of the International Search Authority (Year: 2019).*

(Continued)

*Primary Examiner* — Jayanti K Patel
*Assistant Examiner* — Christopher Kingsbury Glover
(74) *Attorney, Agent, or Firm* — Paratus Law Group, PLLC (57) ABSTRACT

A self-position estimation device includes: a position estimation unit. The position estimation unit is configured to estimate a self-position on the basis of image frames that have been captured at the same time in a constant period by imaging units, and estimate a self-position on the basis of image frames that have been captured at different times in the constant period by at least one of the imaging units.

13 Claims, 5 Drawing Sheets

(56) References Cited

U.S. PATENT DOCUMENTS

2018/0322348 A1* 11/2018 Sweet, III ............... G01S 15/93
2020/0098135 A1* 3/2020 Ganjineh ................. G06T 7/11

OTHER PUBLICATIONS

Thanh, Sakaguchi, Nagahara and Yachida, Stereo SLAM Using Two Estimators, Dec. 17-20, 2006, IEEE 2006 International Conference on Robotics and Biomimetics, Kunming China, pp. 19-24. (Year: 2006).*

Seki, et. al., Simultaneous Optimization of Structure and Motion in Dynamic Scenes Using Unsynchronized Stereo Cameras, IEEE 2007. (Year: 2007).*

* cited by examiner

SELF-POSITION ESTIMATION DEVICE, SELF-POSITION ESTIMATION METHOD, AND PROGRAM THEREOF

CROSS REFERENCE TO PRIOR APPLICATION

This application is a National Stage patent application of PCT International Patent Application No. PCT/JP2019/015755 (filed on Apr. 11, 2019) under 35 U.S.C. § 371, which claims priority to Japanese Patent Application No. 2018-085420 (filed on Apr. 26, 2018), which are all hereby incorporated by reference in their entirety.

TECHNICAL FIELD

The present technology relates to a self-position estimation device, a self-position estimation method, and a program thereof.

BACKGROUND ART

In the past, there has been a technology called SLAM (Simultaneous Localization and Mapping) for realizing mainly autonomous spatial movement of a moving object. SLAM is a technology for estimating a self-position and preparing an environmental map at the same time. For example, a technology for applying SLAM to a head-mounted display that realizes AR (Augmented Reality) and VR (Virtual Reality) has been developed (see, for example, Patent Literature 1).

CITATION LIST

Patent Literature

Patent Literature 1: Japanese Patent Application Laid-open No. 2016-045874

DISCLOSURE OF INVENTION

Technical Problem

In SLAM, in particular, SLAM that uses images obtained by two cameras are called stereoscopic SLAM. In the stereoscopic SLAM, since the number of cameras is doubled, there is a problem that the power consumption, the data processing amount, and the like are increased, as compared with the case where a single camera is used.

It is an object of the present disclosure to provide a self-position estimation device, a self-position estimation method, and a program thereof that are capable of the power consumption and the data processing amount can be reduced in the stereoscopic SLAM.

Solution to Problem

In order to achieve the above-mentioned object, a self-position estimation device according to an embodiment includes a position estimation unit.

The position estimation unit is configured to estimate a self-position on the basis of image frames that have been captured at the same time in a constant period by two imaging units, and estimate a self-position on the basis of image frames that have been captured at different times in the constant period by at least one of the two imaging units.

The position estimation unit uses, in the case where two image frames are captured in a constant period at different times, these image frames to estimate a self-position. That is, since the position estimation can be performed also by at least one imaging unit, the power consumption and the data processing amount can be reduced.

The self-position estimation device may further include an imaging control unit that controls imaging timing of the two imaging units such that the two imaging units perform imaging at different imaging frame rates.

For example, both of the two imaging units perform imaging at least once at different times within a time period other than the same time, whereby the estimation rate of the self-position by the position estimation unit can be higher than the imaging frame rate of the individual imaging unit. Conversely, the imaging frame rate of each of the two imaging units required to achieve the same estimation rate as in the past can be reduced. This makes it possible to reduce the power consumption and data processing amount.

The imaging control unit may execute, where imaging frame rates of the two imaging units are represented by N and M [fps] and the greatest common divisor of the two values is represented by gcd(N, M), control such that an estimation rate O by the position estimation unit satisfies the following relationship:

$$O=N+M-gcd(N,M).$$

The imaging frame rates N and M may be relatively prime.

Alternatively, a difference between the imaging frame rates N and M may be one. As a result, the maximum estimation rate can be realized.

The imaging control unit may variably control the imaging frame rate of at least one of the two imaging units.

The imaging control unit may execute control such that an estimation rate of a self-position is constant.

As a result, even at the same estimation rate as the conventional one, the imaging frame rate of each of the two imaging units can be reduced, and the power consumption and the data processing amount can be reduced.

The imaging control unit may execute, where the same imaging frame rates of the two imaging units are represented by N and M [fps] and the constant period is represented by K [s], control such that the estimation rate O by the position estimation unit satisfies the following relationship: $O=2N-1/K$.

The self-position estimation unit may further include: a detection unit; and a distance estimation unit. The detection unit is configured to detect a feature point in an image frame captured by each of the two imaging units. The distance estimation unit is configured to estimate a distance to the feature point on the basis of the estimated self-position and image frames captured at different times by the two imaging units.

The imaging control unit may execute control such that a period other than the same time includes a period in which only one of the two imaging units performs imaging.

The position estimation unit may be configured to estimate a self-position on the basis of image frames captured at different times by only one of the two imaging units in the constant period.

The distance estimation unit may be configured to estimate the distance to the feature point on the basis of the estimated self-position and the image frames captured at different times by only one of the two imaging units.

The detection unit may be configured to calculate a two-dimensional coordinate of the feature point from a first image frame that is one of the image frames captured at the different times.

The self-position estimation device may further include a motion matching unit configured to determine, on the basis of the first image frame and a second image frame that is the other of the image frames captured at the different times, a corresponding point on the second image frame corresponding to the feature point on the first image frame, the second image frame being captured before the first image frame.

A self-position estimation method according to an embodiment includes: estimating a self-position on the basis of image frames that have been captured at the same time in a constant period by two imaging units; and estimating a self-position on the basis of image frames that have been captured at different times in the constant period by at least one of the two imaging units.

A program according to an embodiment causes a computer to execute the self-position estimation method.

Advantageous Effects of Invention

As described above, in accordance with the present technology, it is possible to reduce the power consumption and the data processing amount in the stereoscopic SLAM.

Note that the effect described here is not necessarily limitative, and any of the effects described in the present disclosure may be provided.

MODE(S) FOR CARRYING OUT THE INVENTION

Embodiments according to the present technology will now be described below with reference to the drawings.

1. Self-Position Estimation Device According to Reference Example

Figure 1:
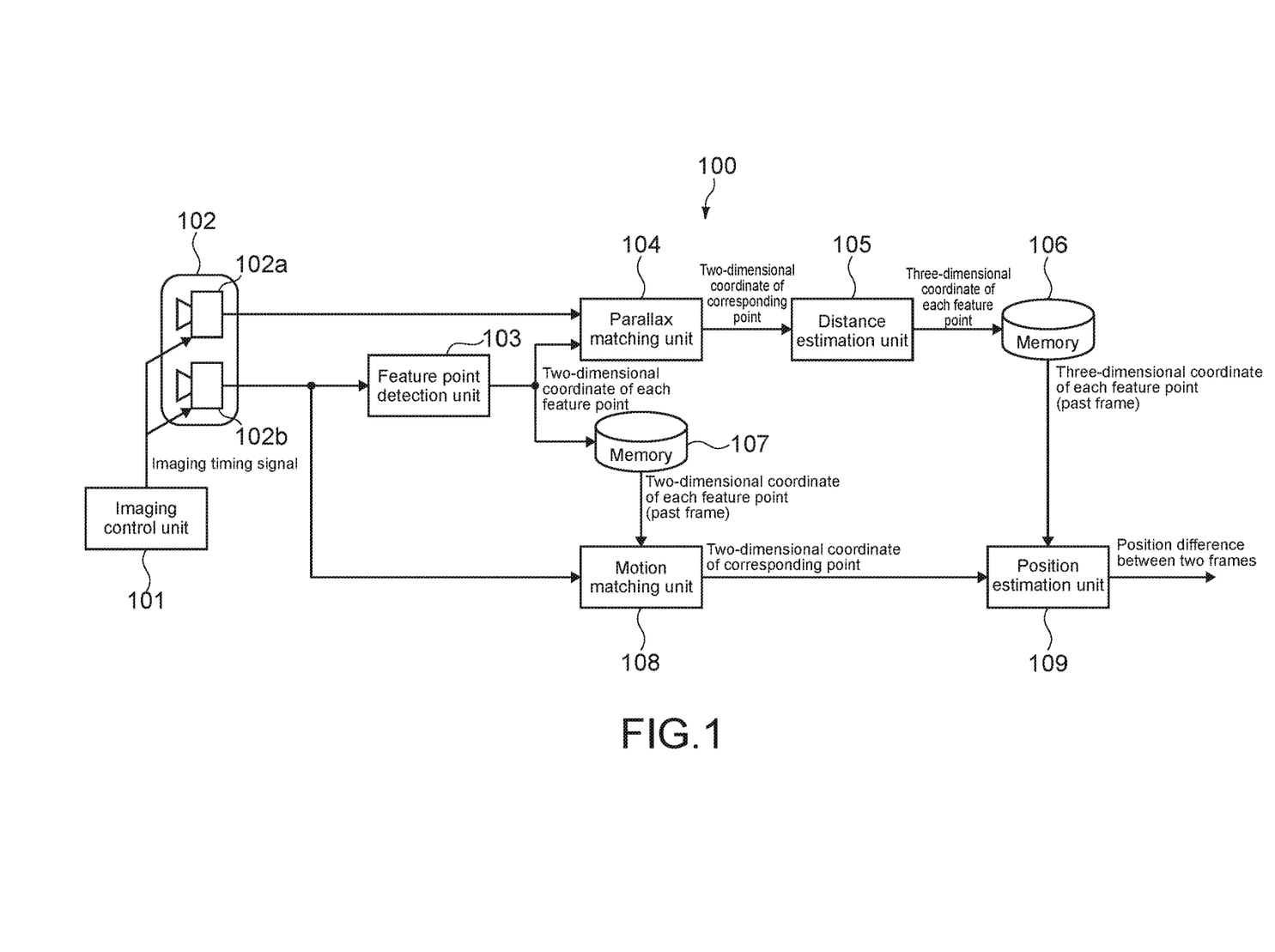
FIG. 1 is a block diagram illustrating a functional configuration of a self-position estimation device according to a Reference Example.

FIG. 1 is a block diagram showing a functional configuration of a self-position estimation device according to a Reference Example. This self-position estimation device 100 includes an imaging control unit 101, a feature point detection unit 103, a parallax matching unit 104, a distance estimation unit 105, memories 106 and 107, a motion matching unit 108, and a position estimation unit 109.

The imaging control unit 101 controls imaging timing of a stereo camera unit 102 including two cameras (imaging units) 102a and 102b. The stereo camera unit 102 performs imaging by using an imaging timing signal supplied by the imaging control unit 101 as a trigger.

Note that various types of correction including optical distortion correction and the like and gain adjustment are performed on the two images captured by the stereo camera unit 102, and parallelization processing is performed to cancel out the posture deviation of the two captured images.

An image processing unit includes the feature point detection unit 103, the parallax matching unit 104, the distance estimation unit 105, the memories 106 and 107, the motion matching unit 108, and the position estimation unit 109.

The feature point detection unit 103 detects a characteristic point used for self-position estimation, i.e., a feature point, of an image frame output from the camera 102b that is one of the two cameras of the stereo camera unit 102. The collection of feature points typically has a pattern that has high contrast and does not have a similar structure in the surroundings. Examples of a method of detecting such a feature point and expressing the feature amount include a method such as Hariis and SIFT (Scale-Invariant Feature Transform).

The parallax matching unit 104 searches the image output from the camera 102a for each point corresponding to each feature point on the other image (output from the camera 102b) detected by the feature point detection unit 103 by a template matching method. The point corresponding to the feature point found here (hereinafter, referred to as the corresponding point) is considered to be a point at which the same object is seen from two viewpoints, and this difference (amount of deviation) in appearance due to the viewpoint is called a parallax. That is, the parallax matching unit 104 outputs a two-dimensional position of the corresponding point (i.e., the two-dimensional coordinate).

The distance estimation unit 105 estimates the distance (from the stereo camera unit 102) of each feature point on the basis of the parallax of each feature point determined by the parallax matching unit 104, and calculates the position of the feature point in the three-dimensional space on the basis of the distance. Since the distance is a distance in a three-dimensional depth direction, it is also called a depth. The method of calculating the distance from the parallax is possible by the principle of triangulation. Specifically, a distance z is obtained by the following formula (1).

$$z = fB/d \quad (1)$$

f: Focal length of camera
B: Distance between two cameras (Baseline length)
d: Observed parallax When the distance z is obtained, 3dCurr(x,y,z), which is a position of the feature point in the three-dimensional space (i.e., three-dimensional coordinate), is calculated by the following formula (2)

(Math. 1)

$$\begin{bmatrix} 3dCurr.x \\ 3dCurr.y \\ 3dCurr.z \end{bmatrix} = z * K^{-1} * \begin{bmatrix} 2dCurr.u \\ 2dCurr.v \\ 1 \end{bmatrix} \quad (2)$$

2dCurr(u,v): Two-dimensional coordinate of corresponding point
K: Internal parameter matrix of camera The point cloud information of the three-dimensional coordinate estimated by the distance estimation unit 105 is stored in the memory 106.

Meanwhile, pieces of information regarding the feature amount (including templates for matching, and the like) of the respective feature points, which are outputs from the feature point detection unit 103, and the two-dimensional coordinate thereof are stored in the memory 107.

These feature point clouds stored in the memories 106 and 107 becomes a point cloud characterizing the past image frame when a temporally "next image frame" is obtained, and is used as the past image frame that is a reference for self-position changes. The "next image frame" becomes the current image frame. Note that the reference symbol "Curr" in the formula (2) is formal, and holds true for the previous frame (past frame) similarly.

The motion matching unit 108 searches, when the next image frame (current image frame) is obtained, the current image frame for the corresponding point of each feature point on the past image frame stored in the memory 107 by the template matching method. That is, the motion matching unit 108 analyzes where each feature point on the past image frame extracted from the memory 107 corresponds to the current image frame. The corresponding point found here is considered to be a point at which the same object is seen from two viewpoints, and the difference in appearance is due to the temporal position (posture) change of the camera 102b.

In the following, for convenience of description, the "current image frame" is referred to simply as "current frame" and the "past image frame" is referred to simply as "past frame".

The position estimation unit 109 estimates the change (difference) in the position of the stereo camera unit 102 from the imaging time of the past frame to the imaging time of the current frame on the basis of the three-dimensional coordinate of the past image frame output from the memory 106 and the two-dimensional coordinate of the corresponding point on current frame output from the motion matching unit 108. That is, this is a change in self-position, and the integration thereof is specified as a self-position in the three-dimensional space. This change in position is also referred to as a pause difference or a pause. The "position" includes the meaning of "posture", and the same applies hereinafter.

Note that the past frame and the current frame need not be temporally consecutive image frames, and there may be another image frame between them. That is, the output rate (estimation rate of a self-position) by the position estimation unit may be lower than the imaging frame rate by both the cameras 102a and 102b.

When a point cloud (three-dimensional position) in the three-dimensional space and a point cloud (two-dimensional position) on the two-dimensional plane corresponding to the point cloud (i.e., projecting the point cloud in the three-dimensional space) in the two-dimensional space are given, determining the position of the projected plane (i.e., the position of the stereo camera unit 102) is possible by solving minimization problems in which errors on the image frame when the respective feature points are projected onto a two-dimensional plane are used as costs.

The reason why the distances of the respective feature points can be determined by the parallax matching unit 104 and the distance estimation unit 105 is because the same point at the same time can be seen from different viewpoints by the stereo camera unit 102. That is, in this case, imaging timing of the two cameras constituting the stereo camera unit 102 needs to be the same.

The use of a stereoscopic camera has the advantage of easy and accurate distance estimation as compared with the case where a single camera is used. Meanwhile, in the case where a stereoscopic camera is used, since the number of cameras is doubled, it is disadvantageous in terms of cost, such as power consumption and data processing amount (due to an increase in the total number of pixels to be processed), as compared with the case where a single camera is used.

In the case where the moving velocity of (a camera mounted on) a moving object, such as a car and a drone, is high and the movement of the moving object changes sharply, as an application of a moving object, it is desired to perform imaging at a higher imaging frame rate in order to improve the accuracy of self-position estimation. For this purpose, the imaging frame rate of the camera only needs to be increased, but the above-mentioned costs are further increased in the case where the stereoscopic camera is used at a high imaging frame rate.

2. Self-Position Estimation Device According to Present Technology

Figure 2:
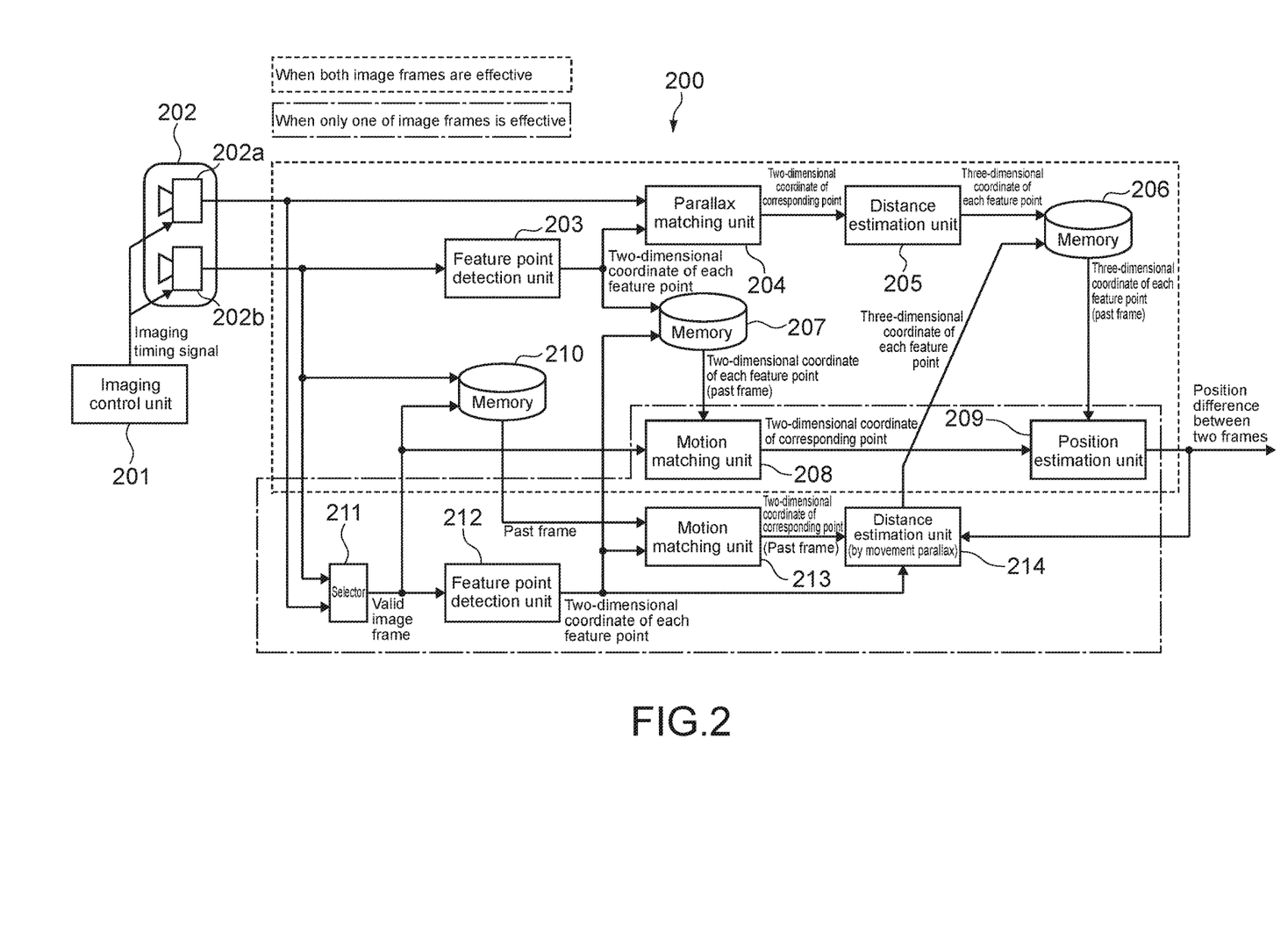
FIG. 2 is a diagram illustrating a functional configuration of a self-position estimation device according to an embodiment of the present technology.

FIG. 2 is a block diagram showing a functional configuration of a self-position estimation device according to an embodiment of the present technology.

A feature point detection unit (detection unit) 203, a parallax matching unit 204, a distance estimation unit 205, memories 206 and 207, a motion matching unit 208, and a position estimation unit 209 of this self-position estimation device 200 respectively have substantially the same functions as those of the feature point detection unit 103, the parallax matching unit 104, the distance estimation unit 105, the memories 106 and 107, the motion matching unit 108, and the position estimation unit 109 of the self-position estimation device 100 shown in FIG. 1. However, the memories 206 and 207 and the motion matching unit 208 store other information in addition to the information shown in FIG. 1.

This self-position estimation device 200 basically includes hardware such as a CPU (Central Processing Unit), a RAM (Random Access Memory), and a ROM (Read Only Memory), and the main functions can be realized by software stored in the RAM or ROM. Instead of the CPU or in addition to the CPU, a PLD (Programmable Logic Device) such as an FPGA (Field Programmable Gate Array), a DSP (Digital Signal Processor), or the like is used in some cases. The same applies to the above-mentioned self-position estimation device 100. At least two of the memories 206, 207, and 210 may include an integral memory device.

An imaging control unit 201 controls imaging timing of a stereo camera unit 202. In the present technology, two cameras 202a and 202b of the imaging control unit 201 perform imaging at the same time in a constant period, and the timings are controlled such that either one of the two cameras 202a and 202b performs imaging at a time different from the other during in the constant period.

Figure 3:
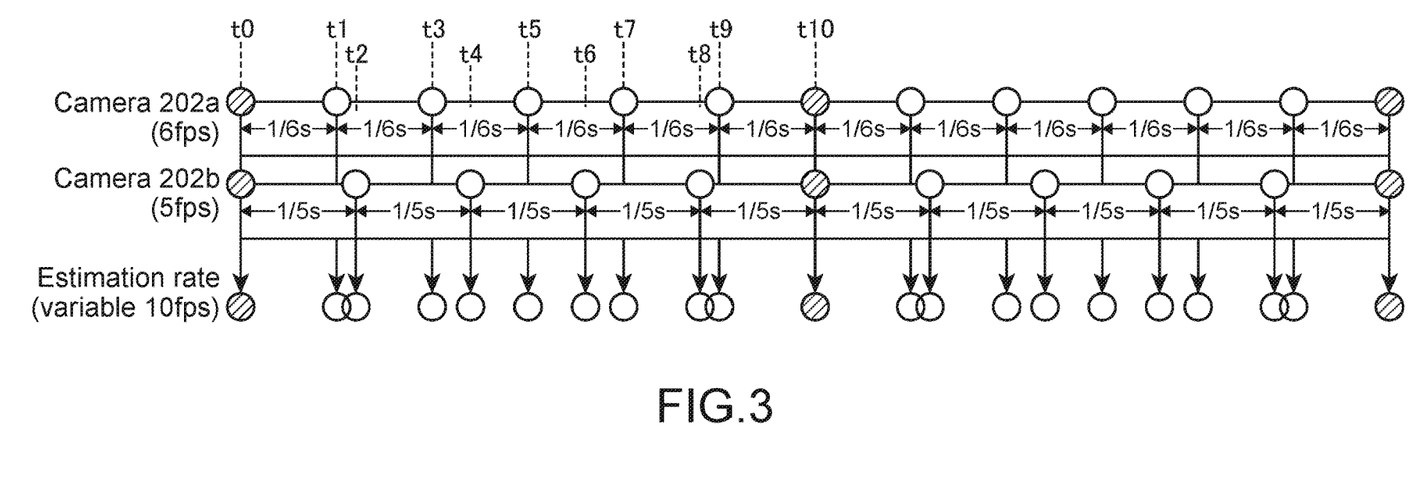
FIG. 3 is a diagram illustrating an example of imaging timing of a stereo camera unit by an imaging control unit according to the embodiment.

FIG. 3 is a diagram showing an example of imaging timing of the stereo camera unit 202 by the imaging control unit 201 according to this embodiment. In this embodiment, the imaging control unit 201 provides imaging timing signals such that imaging frame rates of the two cameras 202a and 202b differ. Specifically, both of the two cameras 202a and 202b perform imaging at the same time in a constant period (1 [s] in FIG. 3) as indicated by hatched circles, and perform imaging at different times within a period other than the same time as indicated by white circles.

In FIG. 3, for example, the imaging frame rate of the camera 202a is 6 [fps], and that of the camera 202b is 5 [fps]. That is, the imaging frame rate differs between the two cameras. The present technology attempts to achieve the output rate (estimation rate of a position) by the position estimation unit 209 by the rate of image frames obtained by both the cameras 202a and 202b.

Note that although FIG. 3 shows a low imaging frame rate for simplicity, frame rates such as 15 to 120 [fps] can be employed in practice.

In FIG. 2, a part surrounded by a broken line is a part that processes image frames captured by the two cameras 202a and 202b at the same time in a constant period. Meanwhile, a part surrounded by a dashed-dotted line is a part that basically processes image frames captured at different times in the constant period by the two cameras 202a and 202b.

Now, FIG. 2 will be described again. The self-position estimation device 200 further includes a selector 211, a memory 210, a feature point detection unit (detection unit) 212, a motion matching unit 213, and a distance estimation unit 214. The selector 211, the feature point detection unit 212, the motion matching unit 213, and the distance estimation unit 214 are functional units for mainly processing image frames (indicated by white circles in FIG. 3) captured at the above-mentioned different times.

Meanwhile, mainly the feature point detection unit 203, the parallax matching unit 204, the distance estimation unit 205, the motion matching unit 208, and the position estimation unit 209 are functional units for mainly processing image frames (indicated by hatched circles in FIG. 3) captured at the same time.

The selector 211 selects and outputs the image frame (hereinafter, referred to as the valid image frame) of the camera that has captured at the current time out of image frames captured at different times by the two cameras 202a and 202b. The valid image frame is input to each of the memory 210, the feature point detection unit 212, and the motion matching unit 208.

The memory 210 stores the image frame captured by the camera 202b (not through the selector 211) when image frames captured at the same time are processed, and stores the valid image frame output from the selector 211 when image frames captured at different times are processed.

The feature point detection unit 212 detects a feature point of the valid image frame. The method of detecting the feature point is similar to that by the feature point detection unit 203. The feature amount (including templates for matching and the like) of the respective feature points detected and obtained by the feature point detection unit 212 and the two-dimensional coordinate thereof are stored in the memory 207. Further, they are input to the motion matching unit 213 and also supplied to the distance estimation unit 214.

The motion matching unit 213 basically extracts an image frame at the past time from the memory 210, and searches the extracted image frame (second image frame) for the corresponding points of the respective feature points on current frame (first image frame) obtained by the feature point detection unit 212 by the template matching method. That is, the motion matching unit 213 analyzes where the feature point on the current frame (first image frame) obtained by the feature point detection unit 212 corresponds to the past frame (second image frame). The corresponding point found here is considered to be a point at which the same object is seen from two viewpoints, and the difference in appearance is due to the temporal change in position of the two cameras 202a and 202b.

Meanwhile, as described above, the motion matching unit 208 differs from the motion matching unit 213 in that the motion matching unit 208 analyzes where the feature point on the past frame extracted from the memory 207 corresponds to the current valid image frame.

The distance estimation unit 214 obtains the two-dimensional coordinate of the corresponding point on the past frame output from the motion matching unit 213, the two-dimensional coordinate of each feature point on the current frame output from the feature point detection unit 212, and the position difference (the position change) output from the position estimation unit 209. Then, the distance estimation unit 214 estimates the distance (depth) to each feature point from the stereo camera unit 202 on the basis of these pieces of information.

The corresponding point on the past frame (corresponding to a different viewpoint) is known for each feature point of the valid image frame (current frame) through the processing by the motion matching unit 213, and the position difference between the current and past frames is known through the processing by the position estimation unit 209. Therefore, the distance estimation unit 214 is capable of estimating the distance by the movement parallax between the image frames (the past frame and the current frame) captured by the two cameras 202a and 202b at differing times. The distance by this movement parallax corresponds to "3dCurr. z" that is the current distance in the formula (6) described below.

When the three-dimensional coordinate of a point on the current frame is represented by 3dCurr, the three-dimensional coordinate of the point as viewed from the past frame is represented by 3dPrev, and the position difference between the two frames is represented by cRb (rotation matrix) and cPb (translation vector), the following formula (3) is established for the three-dimensional coordinates between these two frames.

(Math. 2)

$$3dCurr = cRb \cdot 3dPrev + cPb \qquad (3)$$

Further, from the above-mentioned formula (2), the following formula (4) is established for the three-dimensional coordinate 3dCurr (or 3dPrev) of each point in each image frame and the two-dimensional coordinate 2dCurr (or 2dPrev) obtained by projecting that point on an image frame (two-dimensional plane).

(Math. 3)

$$\begin{cases} 3dCurr = 3dCurr.z * K^{-1} * 2dCurr \\ 3dPrev = 3dPrev.z * K^{-1} * 2dPrev \end{cases} \qquad (4)$$

In the formula (4), the internal parameter matrix K of the cameras 202a and 202b is expressed by the following formula (5) by the focal length f and an optical center c.

(Math. 4)

$$K = \begin{bmatrix} fx & 0 & cx \\ 0 & fy & cy \\ 0 & 0 & 1 \end{bmatrix} \qquad (5)$$

In the formula (4), 2dPrev represents the output value from the motion matching unit 213 and 2dCurr represents the output value from the feature point detection unit 212. From the formulae (3) and (4), the following formula (6) is derived.

(Math. 5)

$$3dCurr.z * \begin{bmatrix} (2dCurr.u - cx)/fx \\ (2dCurr.v - cy)/fy \\ 1 \end{bmatrix} = \qquad (6)$$

$$3dPrev.z * cRb * \begin{bmatrix} (2dPrev.u - cx)/fx \\ (2dPrev.v - cy)/fy \\ 1 \end{bmatrix} + cPb$$

As the processing by the distance estimation unit 214, by solving the simultaneous equation of the above-mentioned formula (6) (three formulas for the two variables (3dCurr.z and 3dPrev.z)), 3dCurr.z, which is the distance of each point in current frame, is obtained.

Note that as shown in FIG. 3, assumption is made that, for example, a time t0 is the imaging start time. At the time t0, imaging is performed at the same time by both the cameras 202a and 202b. Since there is no past frame at the time t0, the position estimation unit 209 cannot estimate the position (position difference) by using only the two image frames obtained at the time t0. The position can be output by the position estimation unit 209 after an image frame is obtained from the camera 202a at the following time t1. For example, at the time t1, the position difference output from the position estimation unit 209 is the position difference between the times t1 and t0.

As described above, the part surrounded by the dashed-dotted line is basically a part that processes image frames captured at different times in the constant period by the two cameras 202a and 202b.

Here, at the time t1, there are principally two image frames captured by the two cameras 202a and 202b at the time t0 as past frames for the valid image frame captured by the camera 202a and selected by the selector 211. As described above, the memory 210 stores the image frame captured by the camera 202b (not through the selector 211), of the two image frames. Therefore, (the two-dimensional coordinate of each feature point of) the current valid image frame captured by the camera 202a at time t1 and the past frame captured by the camera 202b, which is stored in the memory 210, are input to the motion matching unit 213 and processed.

Note that the target to be stored in the memory 210 not through the selector 211 may be an image frame captured by the camera 202a. In this case, (the two-dimensional coordinate of each feature point of) the current valid image frame captured by the camera 202a at the time t1 and the past frame captured by the camera 202a stored in the memory 210 can be input by the motion matching unit 213 and processed.

Since the distance estimation unit 214 acquires information regarding the position difference output from the position estimation unit 209, the target to be processed by the distance estimation unit 214 includes also the past frame. Therefore, the distance estimation unit 214 is capable of outputting the distance after an image frame is obtained from the camera 202a at the time t1. After that (after the time t2), in order for the position estimation unit 209 and the distance estimation unit 214 to execute the processing in a similar way, the memory 206 stores the output value of the distance estimation unit 214 (three-dimensional coordinate including the distance 3dCurr.z of each feature point).

The memory 207 stores the two-dimensional coordinate of the point cloud on the valid image frame obtained by the feature point detection unit 212 when image frames captured at different times are processed. For example, the memory 207 stores the two-dimensional coordinate of the point cloud on the image frame at a time t9. At the following time t10, the motion matching unit 208 is capable of obtaining the two-dimensional coordinate of the corresponding point on the basis of the (past) image frame captured at the time t9 and the current frame captured by the camera 202b at the time t10.

Note that the motion matching unit 208 may obtain, at the time t10, the two-dimensional coordinate of the corresponding point on the basis of the past frame captured at the time t9 and current frame captured by the camera 202a at the time t10.

On the assumption that the cameras 202a and 202b are rigidly connected, the position of the camera 202a can be estimated at the timing at which imaging is performed only by the camera 202b (or conversely, the position of the camera 202b can be estimated at the timing at which imaging is performed only by the camera 202a). The position difference between the two cameras 202a and 202b is represented by aRb (rotation matrix) and aPb (translation vector). When the position of the camera 202b determined from the camera 202b is represented by bRc (rotation matrix) and bPc (translation vector), aRc (rotation matrix) and aPc (translation vector) representing the position of the camera 202a are respectively obtained by the following formulas (7) and (8). Note that the symbol "*" means product.

$$aRc = aRb * bRc \qquad (7)$$

$$aPc = aRb * bPc + aPb \qquad (8)$$

The opposite case (the case of determining the position of the camera 202b from the position of the camera 202a) is likewise possible. The position differences aPb and aRb between the two cameras 202a and 202b may be known. Alternatively, the system may dynamically estimate the position differences aPb and aRb from the relationship between the estimated positions of the cameras 202a and 202b using a Kalman filter or the like.

As described above, the self-position estimation device 200 according to this embodiment is capable of estimating the positions of both the cameras 202a and 200b both at the timing when the two cameras 202a and 200b perform imaging at the same time and at the timing when only one of the cameras 202a and 202b performs imaging. As a result, it is possible to estimate the position at a rate higher than the imaging frame rate of one of the cameras.

For example, in the example shown in FIG. 3, for the imaging frame rates of 6 [fps] and 5 [fps], the estimation rate of the position is 10 [fps]. For example, for the imaging frame rates of 60 [fps] and 59 [fps], the estimation rate of the position is 118 [fps].

As described above, in the case where the imaging frame rates between the two cameras 202a and 202b differ, the estimation rate O of the position can be expressed by the formula (9) when the imaging frame rates are represented by N and M [fps]. Note that gcd(N,M) in the formula (9) represents the greatest common divisor of N and M.

$$O = N + M - gcd(N, M) \qquad (9)$$

As shown in FIG. 3, the maximum estimation rate can be achieved when the imaging frame rates N and M are relatively prime and the difference between them is 1.

As described above, in this embodiment, the estimation rate can be increased. Conversely, the imaging frame rate required to achieve the same estimation rate as the imaging frame rate of one of the cameras can be reduced (to approximately ½ at most). As a result, it is possible to reduce the power consumption and the data processing amount.

Note that as shown in FIG. 3, in the case where the two cameras 202a and 202b are driven at different frame rates, the timing at which imaging is performed at completely the same time exists only once per second. Depending on the imaging frame rate, however, there may be cases where imaging is performed at pretty close times (imaging timings of the two cameras 202a and 202b are close to each other) even if they are not completely the same time. The difference in the imaging timing between the two cameras 202a and 202b is negligibly small in terms of the moving velocity of the moving object in some cases. In this case, the self-position estimation device 200 may estimate the distance and position (perform processing within a frame indicated by a broken line in FIG. 2) by regarding the imaging timings as the same time.

In the case where the moving velocity of the moving object is high, there are cases where the difference in the imaging timing between the cameras 202a and 202b cannot be ignored even if the difference is small. Therefore, when designing or producing the self-position estimation device 200, the threshold value of the negligible difference in the imaging timing only needs to be set depending on the maximum moving velocity that the moving object on which the self-position estimation device 200 is mounted can take.

Figure 4:
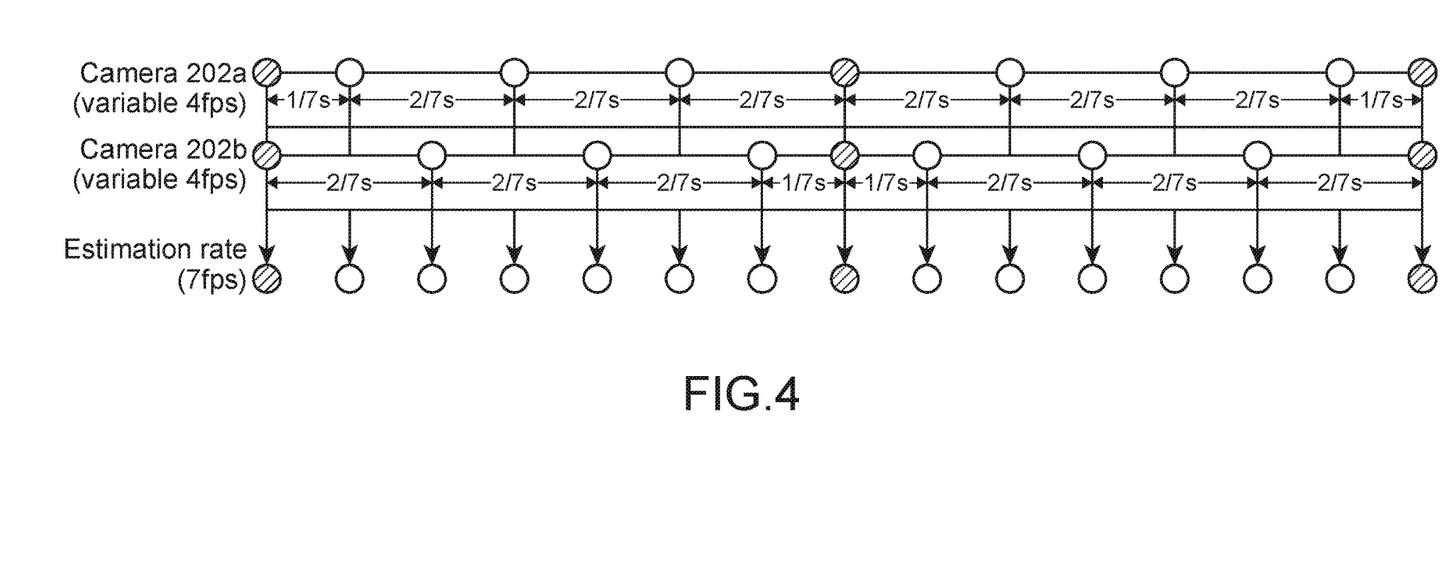
FIG. 4 is a diagram illustrating another example of the imaging timing of the stereo camera unit by the imaging control unit according to the embodiment.

The imaging control unit 201 is also capable of variably controlling imaging timing. FIG. 4 shows an example of such a variable imaging timing. This example includes periods in which imaging frame rates of the two cameras 202a and 202b are the same, but the phases are shifted by half a cycle from each other in a constant period where imaging is performed at the same time.

Specifically, similarly to the case shown in FIG. 3, imaging is performed at the same time in a constant period of 1 [s] by the two cameras 202a and 202b. The imaging frame rate is variable 4 [fps] in both the cameras 202a and 202b. For a period other than the same time in the constant period, the camera 202a performs imaging at 7 [fps] at the first time after the same time, and the camera 202b performs imaging at 7 [fps] at the last time after the same time. Thus, by making imaging timing variable, the estimation rate can be made constant.

In the example shown in FIG. 4, when the imaging frame rate is represented by N [fps] and the intervals at which synchronization frames for aligning the imaging timing are inserted are represented by K [s], the estimation rate O can be expressed by the formula (10).

$$O=2N-1/K \quad (10)$$

Figure 5:
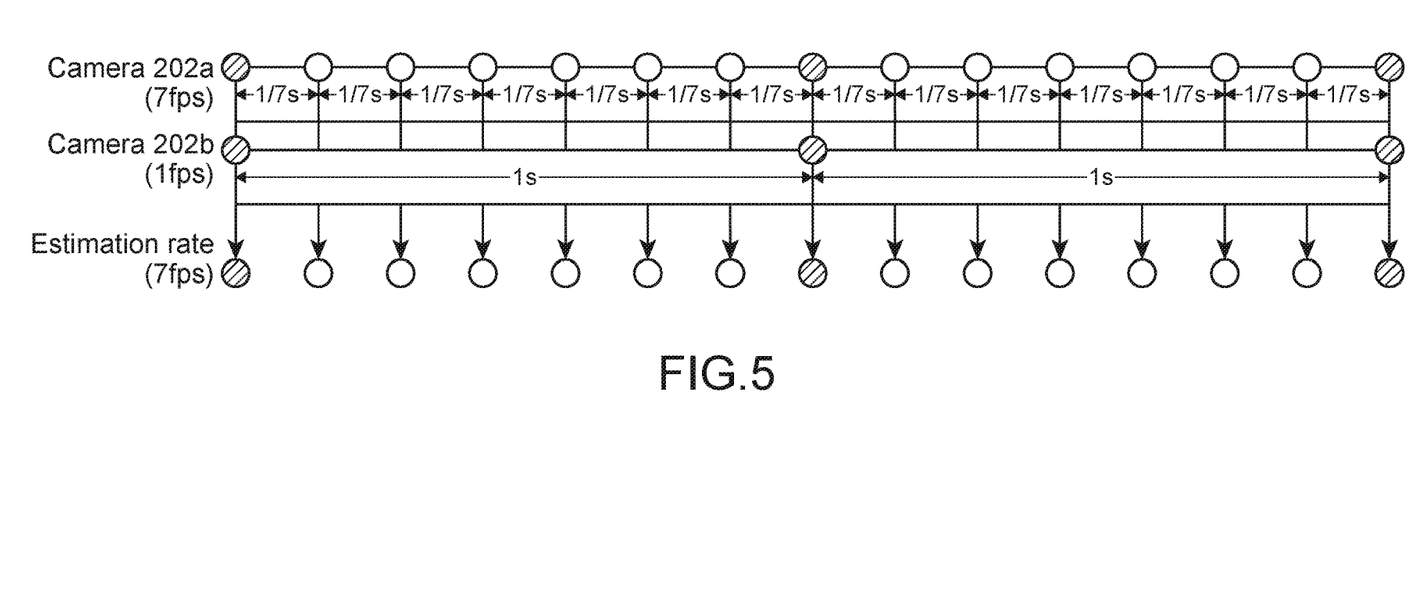
FIG. 5 is a diagram illustrating still another example of the imaging timing of the stereo camera unit by the imaging control unit according to the embodiment.

FIG. 5 illustrates still another example of imaging timing of the imaging control unit 201. In this example, the imaging control unit 201 executes control such that the two cameras 202a and 202b perform imaging at the same time in a constant period (1 [s]) and the period other than the same time in the constant period includes a period in which only one of the two cameras 202a and 202b, here, only the camera 202a performs imaging. The imaging frame rate of the period in which only the camera 202a performs imaging is, for example, 7 [fps]. In this case, the estimation rate is the same as the imaging frame rate of the camera 202a.

In this example, the camera 202a performs imaging at least twice in succession during the period other than the same time imaging in the constant period. That is, the camera 202a performs imaging at different times during a period in which the camera 202b does not perform imaging. In this case, the position estimation unit 209 and the distance estimation unit 214 is capable of making use of the two image frames successively captured by the camera 202a in such a way to perform position estimation and distance estimation between the image frames. Processing employing such imaging timing is also included in the scope of the present technology.

In the example shown in FIG. 5, since the position estimation can be performed also by at least one camera 202a, it is possible to reduce the power consumption and the data processing amount.

Here, there are three main advantages of the processing employing an example of imaging timing shown in FIGS. 3 and 4. These three advantages will be described below in comparison with the processing employing the example of imaging timing shown in FIG. 5.

First, when comparing the imaging frame rate of the camera, the example shown in FIG. 4 has an advantage that the exposure time can be lengthened. In the example shown in FIG. 4, since the imaging frame required to achieve the same estimation rate (the individual frame rate of the cameras 202a and 202b) as in the example shown in FIG. 5 is lower than that in FIG. 5, the exposure time can be lengthened. The example shown in FIG. 4 is particularly advantageous in the dark where the SN ratio is a problem.

Second, there is a possibility that the effect of a single camera being off-calibrated can be mitigated in the examples illustrated in FIGS. 3 and 4. For example, as compared with the case where the position is estimated using only one camera 202a as in the case of the example shown in FIG. 5, the position can be estimated by the two cameras 202a and 202b and the results can be optimized by a Kalman filter or the like in the examples shown in FIGS. 3 and 4. Therefore, even if there is a failure or the like in one camera, there is a possibility that the other camera can compensate for the failure or the like.

Third, there is an advantage that a wide angle of view, which is included in the two cameras 202a and 202b (corresponding to the two cameras), can be used.

3. Modified Example

The present technology is not limited to the embodiments described above, and can achieve various other embodiments.

As a modified example of the example shown in FIG. 5, the camera 202b may perform imaging at least one time even in a period other than the same time. For example, the camera 202a is capable of performing imaging at the imaging frame rate of 7 [fps] and the camera 202b is capable of performing imaging at the imaging frame rate of 2 [fps]. Also in this case, the camera 202a performs imaging at different times within a period in which the camera 202b does not perform imaging, similarly to the example shown in FIG. 5.

The two cameras 202a and 202b each include an imaging sensor that mainly receives visible light, but may include an imaging sensor capable of imaging ultraviolet light and infrared light.

Out of the feature parts of each embodiment described above, at least two feature parts can be combined.

It should be noted that the present technology may take the following configurations.

(1)
A self-position estimation device, including:
a position estimation unit configured to estimate a self-position on the basis of image frames that have been captured at the same time in a constant period by two imaging units, and estimate a self-position on the basis of image frames that have been captured at different times in the constant period by at least one of the two imaging units.
(2)
The self-position estimation device according to (1) above, further including
an imaging control unit that controls imaging timing of the two imaging units such that the two imaging units perform imaging at different imaging frame rates.
(3)
The self-position estimation device according to (2) above, in which
the imaging control unit executes, where imaging frame rates of the two imaging units are represented by N and M [fps] and the greatest common divisor of the two values is represented by gcd(N,M), control such that an estimation rate O by the position estimation unit satisfies the following relationship:

$$O=N+M-gcd(N,M).$$

(4)
The self-position estimation device according to (3) above, in which
the imaging frame rates N and M are relatively prime.
(5)
The self-position estimation device according to (4) above, in which
a difference between the imaging frame rates N and M is one.
(6)
The self-position estimation device according to (1) above, in which
the imaging control unit controls the imaging frame rate of at least one of the two imaging units.
(7)
The self-position estimation device according to (6) above, in which
the imaging control unit executes control such that an estimation rate of a self-position is constant.
(8)
The self-position estimation device according to (7) above, in which
the imaging control unit executes, where the same imaging frame rates of the two imaging units are represented by N and M [fps] and the constant period is represented by K [s], control such that an estimation rate O by the position estimation unit satisfies the following relationship:

$$O=2N-1/K.$$

(9)
The self-position estimation device according to (1) above, further including:
a detection unit is configured to detect a feature point in an image frame captured by each of the two imaging units; and
a distance estimation unit is configured to estimate a distance to the feature point on the basis of the estimated self-position and image frames captured at different times by the two imaging units.
(10)
The self-position estimation device according to (9) above, further including an imaging control unit that controls imaging timing of the two imaging units such that the two imaging units perform imaging at different imaging frame rates, in which
the imaging control unit executes control such that a period other than the same time includes a period in which only one of the two imaging units performs imaging,
the position estimation unit is configured to estimate a self-position on the basis of image frames captured at different times by only one of the two imaging units in the constant period, and
the distance estimation unit is configured to estimate the distance to the feature point on the basis of the estimated self-position and the image frames captured at different times by only one of the two imaging units.
(11)
The self-position estimation device according to (9) or (10) above, in which
the detection unit is configured to calculate a two-dimensional coordinate of the feature point from a first image frame that is one of the image frames captured at the different times, the self-position estimation device further including
a motion matching unit configured to determine, on the basis of the first image frame and a second image frame that is the other of the image frames captured at the different times, a corresponding point on the second image frame corresponding to the feature point on the first image frame, the second image frame being captured before the first image frame.
(12)
A self-position estimation method, including:
estimating a self-position on the basis of image frames that have been captured at the same time in a constant period by two imaging units; and
estimating a self-position on the basis of image frames that have been captured at different times in the constant period by at least one of the two imaging units.
(13)
A program that causes a computer to execute:
estimating a self-position on the basis of image frames that have been captured at the same time in a constant period by two imaging units; and
estimating a self-position on the basis of image frames that have been captured at different times in the constant period by at least one of the two imaging units.

REFERENCE SIGNS LIST 200 self-position estimation device
201 imaging control unit
202 stereo camera unit
202a, 202b camera
203, 212 feature point detection unit
204 parallax matching unit
205, 214 distance estimation unit
206, 207, 210 memory
208, 213 a motion matching unit
209 position estimation unit
211 selector

The invention claimed is:
1. A self-position estimation device, comprising:
an imaging control unit configured to control imaging time of two imaging units such that one of the two imaging units perform imaging at a first imaging frame rate and another of the two imaging units perform imaging at a second imaging frame rate different than the first imaging frame rate; and a position estimation unit configured to
   estimate a first self-position on a basis of image frames that have been captured at a same time in a constant period by the two imaging units, and
   estimate a second self-position on a basis of image frames that have been captured at times in the constant period by one of the two imaging units and image frames that have been captured by individual imaging unit actuation at other times in the constant period by another of the two imaging units, each of the other times being different than each of the times, wherein
   the estimation of the second self-position on the basis of the image frames that have been captured at different times in the constant period include only utilizing image frames that have been captured at times in the constant period at which only one of the two imaging units perform imaging, and
   the imaging control unit and the position estimation unit are each implemented via at least one processor.

2. The self-position estimation device according to claim 1, wherein the image frames that have been captured at the same time in the constant period occurs only once in the constant period.

3. The self-position estimation device according to claim 1, wherein
   the imaging control unit is further configured to execute, where imaging frame rates of the two imaging units are represented by N and M [fps] and a greatest common divisor of the imaging frame rates N and M is represented by gcd(N, M), control such that an estimation rate O by the position estimation unit satisfies the following relationship:

$O=N+M-gcd(N,M)$.

4. The self-position estimation device according to claim 3, wherein
   the imaging frame rates N and M are relatively prime.

5. The self-position estimation device according to claim 4, wherein
   a difference between the imaging frame rates N and M is one.

6. The self-position estimation device according to claim 1, wherein
   the imaging control unit is further configured to control the imaging frame rate of at least one of the two imaging units.

7. The self-position estimation device according to claim 6, wherein
   the imaging control unit is further configured to execute control such that an estimation rate of a self-position is constant.

8. The self-position estimation device according to claim 7, wherein
   the imaging control unit is further configured to execute, where the imaging frame rates of the two imaging units are represented by N [fps] and the constant period is represented by K [s], control such that an estimation rate O by the position estimation unit satisfies the following relationship:

$O=2N-1/K$.

9. The self-position estimation device according to claim 1, further comprising:
   a detection unit configured to detect a feature point in an image frame captured by each of the two imaging units; and
   a distance estimation unit configured to estimate a distance to the feature point on a basis of the estimated second self-position and image frames captured at different times by the two imaging units,
   wherein the detection unit and the distance estimation unit are each implemented via at least one processor.

10. The self-position estimation device according to claim 9, further comprising
    an imaging control unit configured to control imaging timing of the two imaging units such that the two imaging units perform imaging at different imaging frame rates, wherein
    the imaging control unit is further configured to execute control such that a period other than the same time includes a period in which only one of the two imaging units performs imaging,
    the position estimation unit is further configured to estimate a third self-position on a basis of image frames captured at different times by only one of the two imaging units in the constant period,
    the distance estimation unit is further configured to estimate the distance to the feature point on a basis of the estimated third self-position and the image frames captured at different times by only one of the two imaging units, and
    the image control unit is implemented via at least one processor.

11. The self-position estimation device according to claim 9, wherein
    the detection unit is further configured to calculate a two-dimensional coordinate of the feature point from a first image frame that is one of the image frames captured at the different times,
    the self-position estimation device further comprises a motion matching unit configured to determine, on a basis of the first image frame and a second image frame that is another of the image frames captured at the different times, a corresponding point on the second image frame corresponding to the feature point on the first image frame, the second image frame being captured before the first image frame, and
    the motion matching unit is implemented via at least one processor.

12. A self-position estimation method, comprising:
    controlling imaging time of two imaging units such that one of the two imaging units perform imaging at a first imaging frame rate and another of the two imaging units perform imaging at a second imaging frame rate different than the first imaging frame rate;
    estimating a first self-position on a basis of image frames that have been captured at a same time in a constant period by the two imaging units; and
    estimating a second self-position on a basis of image frames that have been captured at times in the constant period by one of the two imaging units and image frames that have been captured by individual imaging unit actuation at other times in the constant period by another of the two imaging units, each of the other times being different than each of the times, wherein
    the estimation of the second self-position on the basis of the image frames that have been captured at different times in the constant period include only utilizing image frames that have been captured at times in the constant period at which only one of the two imaging units perform imaging.

13. A non-transitory computer-readable medium having embodied thereon a program, which when executed by a computer causes the computer to execute a self-position estimation method, the method comprising:
controlling imaging time of two imaging units such that one of the two imaging units perform imaging at a first imaging frame rate and another of the two imaging units perform imaging at a second imaging frame rate different than the first imaging frame rate;
estimating a first self-position on a basis of image frames that have been captured at a same time in a constant period by the two imaging units; and
estimating a second self-position on a basis of image frames that have been captured at times in the constant period by one of the two imaging units and image frames that have been captured by individual imaging unit actuation at other times in the constant period by another of the two imaging units, each of the other times being different than each of the times, wherein
the estimation of the second self-position on the basis of the image frames that have been captured at different times in the constant period include only utilizing image frames that have been captured at times in the constant period at which only one of the two imaging units perform imaging.

\* \* \* \* \*